(12) United States Patent
Keenihan et al.

(10) Patent No.: US 8,584,407 B2
(45) Date of Patent: Nov. 19, 2013

(54) DIRECT MOUNTED PHOTOVOLTAIC DEVICE WITH IMPROVED SIDE CLIP

(75) Inventors: James R. Keenihan, Midland, MI (US);
Michelle L. Boven, Midland, MI (US);
Claude Brown, Jr., Saginaw, MI (US);
Gerald K. Eurich, Merrill, MI (US);
Ryan S. Gaston, Midland, MI (US);
Michael Hus, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 342 days.

(21) Appl. No.: 12/907,530

(22) Filed: Oct. 19, 2010

(65) Prior Publication Data
US 2011/0094560 A1 Apr. 28, 2011

Related U.S. Application Data

(60) Provisional application No. 61/253,978, filed on Oct. 22, 2009.

(51) Int. Cl.
*E04H 14/00* (2006.01)

(52) U.S. Cl.
USPC ........................................................ 52/173.3

(58) Field of Classification Search
USPC ........................................................ 52/173.3
See application file for complete search history.

(56) References Cited

U.S. PATENT DOCUMENTS

| | | | |
|---|---|---|---|
| 2,631,887 A | 3/1953 | Wernig | |
| 4,586,301 A | 5/1986 | Hickman | |
| 4,627,207 A | 12/1986 | Young et al. | |
| 4,641,471 A | 2/1987 | Young et al. | |
| 4,641,472 A | 2/1987 | Young et al. | |
| 4,686,808 A | 8/1987 | Triplett | |
| 5,239,802 A | 8/1993 | Robinson | |
| 5,950,387 A | 9/1999 | Stahl et al. | |
| 6,148,570 A | 11/2000 | Dinwoodie et al. | |
| 6,247,289 B1 | 6/2001 | Karpinia | |
| 6,397,556 B1 | 6/2002 | Karpinia | |
| 6,725,623 B1 | 4/2004 | Riddell et al. | |
| 6,758,019 B2 | 7/2004 | Kalkanoglu et al. | |
| 6,845,592 B2 | 1/2005 | Voegele | |
| RE38,988 E | 2/2006 | Dinwoodie | |
| 7,118,794 B2 | 10/2006 | Kalkanoglu et al. | |
| 7,178,295 B2 | 2/2007 | Dinwoodie | |

(Continued)

FOREIGN PATENT DOCUMENTS

| JP | S56-169020 U | 12/1981 |
|---|---|---|
| JP | 2000-501469 A | 4/1998 |

(Continued)

OTHER PUBLICATIONS

Search Report dated Apr. 4, 2011, International Application No. PCT/US2010/053189.

(Continued)

*Primary Examiner* — Mark Wendell
(74) *Attorney, Agent, or Firm* — The Dobrusin Law Firm, PC

(57) ABSTRACT

The present invention is premised upon a photovoltaic assembly system for securing and/or aligning at least a plurality of vertically adjacent photovoltaic device assemblies to one another. The securing function being accomplished by a clip member that may be a separate component or integral to one or more of the photovoltaic device assemblies.

18 Claims, 4 Drawing Sheets

(56) References Cited

U.S. PATENT DOCUMENTS

| | | |
|---|---|---|
| 7,204,063 B2 | 4/2007 | Kandalgaonkar |
| 7,299,598 B2 | 11/2007 | Gembala et al. |
| 2002/0066235 A1 | 6/2002 | Stearns et al. |
| 2003/0154680 A1 | 8/2003 | Dinwoodie |
| 2003/0188500 A1 | 10/2003 | Voegele |
| 2004/0083673 A1 | 5/2004 | Kalkanoglu et al. |
| 2004/0206035 A1 | 10/2004 | Kandalgaonkar |
| 2004/0216405 A1 | 11/2004 | Gembala et al. |
| 2005/0229924 A1 | 10/2005 | Luconi et al. |
| 2007/0193135 A1 | 8/2007 | Vandenberg |
| 2007/0295391 A1 | 12/2007 | Lenox et al. |
| 2008/0000173 A1 | 1/2008 | Lenox et al. |
| 2008/0083169 A1 | 4/2008 | Sicurella |
| 2008/0196231 A1 | 8/2008 | Grove |
| 2008/0196358 A1 | 8/2008 | Schafer-Roth |
| 2008/0245399 A1 | 10/2008 | DeLiddo |
| 2008/0245404 A1 | 10/2008 | DeLiddo |
| 2008/0313976 A1* | 12/2008 | Allen .......... 52/173.1 |
| 2009/0000220 A1 | 1/2009 | Lenox |
| 2010/0180523 A1 | 7/2010 | Lena et al. |
| 2010/0242381 A1* | 9/2010 | Jenkins .......... 52/173.3 |

FOREIGN PATENT DOCUMENTS

| | | |
|---|---|---|
| JP | H10-231590 A | 9/1998 |
| JP | H11-303323 A | 11/1999 |
| WO | 03071047 A2 | 8/2003 |
| WO | 2007079382 A2 | 7/2007 |
| WO | 2007123927 A2 | 11/2007 |

OTHER PUBLICATIONS

JP Office Action in JP2012-535299 dated Jul. 30, 2013.

* cited by examiner

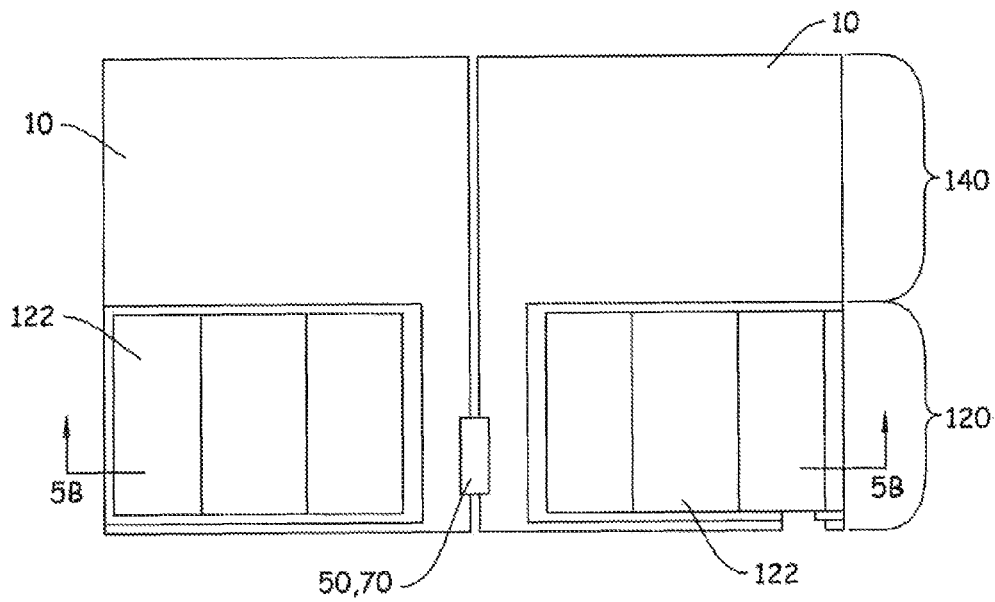
Fig. 5A
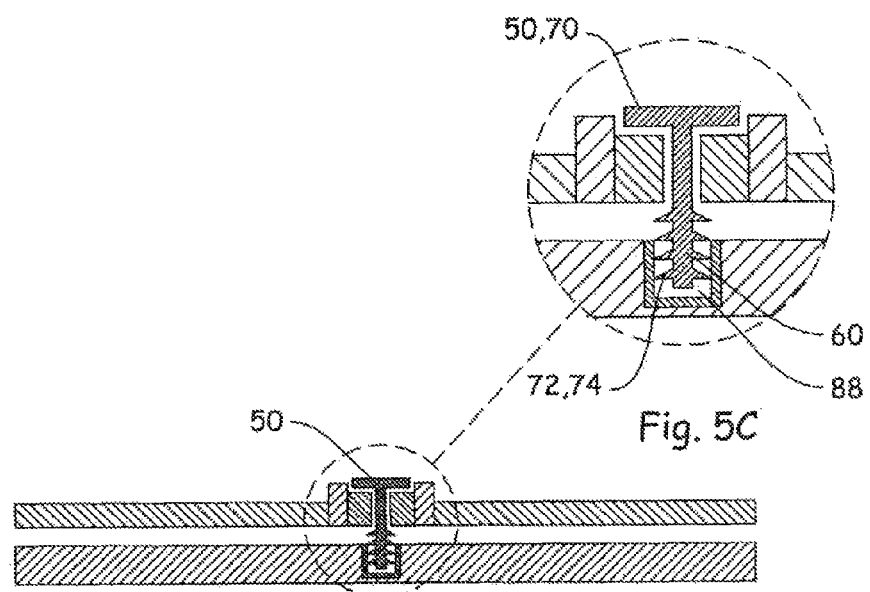
Fig. 5C
Fig. 5B

US 8,584,407 B2

DIRECT MOUNTED PHOTOVOLTAIC DEVICE WITH IMPROVED SIDE CLIP

CLAIM OF PRIORITY

The present application claims the benefit of the filing date of U.S. Provisional Application No. 61/253,978 (filed 22 Oct. 2009) the contents of which are hereby incorporated by reference in their entirety.

This invention was made with U.S. Government support under contract DE-FC36-07G017054 awarded by the Department of Energy. The U.S. Government has certain rights in this invention.

FIELD OF THE INVENTION

The present invention relates to a photovoltaic device and method thereof that is directly mounted to a structure, more particularly a photovoltaic shingle and method thereof adapted to be directly mounted to a building structure such as a roof deck or wall.

BACKGROUND

Efforts to improve the state of the art in the area of solar power generation; particularly in the area of building mounted generation has been receiving ever increasing industry focus over the last few years. A subset of building mounted generation is building-integrated photovoltaics (BIPV), where the photovoltaic elements are integral parts of the building (such as providing exterior weather skin as in shingles or siding. Of particular importance is the goal of providing a reliable and durable solar power generation system that provides the most kilowatt hours (KwH) for the least amount of cost. Some of the issues associated with reaching this goal concern the ability of the generation system to be easy to assemble and install, have a relatively high KwH output, and be durable (e.g. hold up over time given the likely environmental conditions such as relatively high winds and rain). One particular issue related to durability is that of wind loading, such as determined via (Underwriters Laboratories) UL 1897, Tests for Uplift Resistance of Roof Assemblies. That is the ability of the system to resist damage when subjected to winds, for example, in excess of 100 miles per hour or more. One particular issue related to installation ease is the need to keep the BIPV from becoming active (e.g. producing electricity) before it is wanted. Other potential issues relates to alignment of adjoining solar devices, and potential packaging and shipping issues.

The current state of the art building mounted solar power generation systems take many forms, but can generally be characterized as either solar panels that are mounted to elaborate mounting structures (e.g. inside box frames, platform risers, for example: SunPower Model 31® by SunPower® of San José, Calif., USA) creating a solar power generation assembly with a cross sectional thickness (e.g. 25 mm or more) and a high stiffness (e.g. about 70000 MPa "MegaPascal", Modulus of elasticity) or flexible laminate structures (e.g. rolled solar laminates offered by Uni-Solar® of Rochester Hills, Mich., USA) which are similar in cross sectional area thickness (e.g. about 1.5 to 7 mm) and stiffness (e.g. about 5 to 50 MPa) to typical asphalt roofing shingles. Of note, it is believed that traditional cedar shake type roofing shingles are typically about 1 to 5 times thicker than typical asphalt roofing shingles and have a stiffness of about 4000 to 9000 MPa, but do not suffer from wind uplift issues. It is not surprising, that the SunPower type system does not suffer from wind uplift issues (e.g. due to the elaborate mounting structures and/or the high stiffness). It is also not surprising that the Uni-Solar type system can weather the wind uplift issue because the entire laminate is adhesively bonded to the building structure.

Among the literature that may pertain to this technology include the following patent documents: US Patent Publications: 20090000220; 20080245404; 20080245399; 20080196358; 20080196231; 20080083169; 20080000173; 20070295391; 20070193135; 20050229924; 20040216405; 20040206035; 20040083673; 20030188500; 20030154680; 20020066235; U.S. Pat. Nos. 7,299,598; 7,204,063; 7,178,295; 7,118,794; 6,845,592; 6,758,019; 6,725,623; 6,397,556; 6,247,289; 6,148,570; 5,950,387; 5,239,802; 4,686,808; 4,641,472; 4,641,471; 4,627,207; 4,586,301; 2,631,887; RE38988; and PCT Publications: WO2007123927A2; WO2007079382A2; WO2003071047A2, all incorporated herein by reference for all purposes.

SUMMARY OF THE INVENTION

The present invention is directed to a photovoltaic device and method thereof that is directly mounted to a structure (e.g. building structure, wall and/or roof deck). The invention is addressing one or more of the issues/problems discussed above.

Moreover, the present invention relates to a new kind of building mounted solar power generation systems. This new system is a plurality of individual "shingle-like" structures mounted to a building structure with fasteners (e.g. nails, screws, or the like) and has a high stiffness (e.g. about up to about 10000 MPa) and a thickness of about 15 mm. Surprisingly, given the relatively high stiffness/thickness of the system (e.g. similar to cedar shakes), it may require the improvements disclosed herein to achieve the goals discussed above.

Accordingly, pursuant to one aspect of the present invention, there is contemplated a photovoltaic assembly system for securing and aligning at least a lower photovoltaic array with a first photovoltaic device assembly and a third photovoltaic device assembly, with an upper photovoltaic array with a second photovoltaic device assembly, wherein the second photovoltaic device assembly is at least partially overlapping to the others, includes: a. the first photovoltaic device assembly, with a first lower and a first upper portion, includes a first top surface portion, a first bottom surface portion, a first middle surface portion spanning between the top and bottom surface portions; b. the second photovoltaic device assembly, with a second lower and a second upper portion, includes a second top surface portion, a second bottom surface portion, a second middle surface portion spanning between the top and bottom surface portions; c. the third photovoltaic device assembly, with a third lower and a third upper portion, includes a third top surface portion, a third bottom surface portion, a third middle surface portion spanning between the top and bottom surface portions; and d. at least one clip connectively disposed on the first, second, and third photovoltaic device, the clip includes at least one clip mating portion including a clip top surface portion, a clip bottom surface portion, a clip middle surface portion spanning between the top and bottom surface portions, at least one clip hook portion is at least partially adapted to mate to the middle surface portion of the second photovoltaic device and the top surface portion of the second photovoltaic device.

Accordingly, pursuant to one aspect of the present invention, there is contemplated a photovoltaic assembly system for securing and aligning at least an upper photovoltaic array with a first photovoltaic device assembly and a third photovoltaic device assembly, with an lower photovoltaic array with a second photovoltaic device assembly, wherein the first and third photovoltaic device assembly is at least partially overlapping to the others, including: a. the first photovoltaic device assembly, with a first lower and a first upper portion, includes: i. a first top surface portion, a first bottom surface portion, a first middle surface portion spanning between the top and bottom surface portions; b. the second photovoltaic device assembly, with a second lower and a second upper portion, includes: i. a second top surface portion, a second bottom surface portion, a second middle surface portion spanning between the top and bottom surface portions; c. the third photovoltaic device assembly, with a third lower and a third upper portion, includes: i. a third top surface portion, a third bottom surface portion, a third middle surface portion spanning between the top and bottom surface portions; and d. at least one clip connectively disposed on the first, second, and third photovoltaic device, the clip including: i. at least one clip a securing device including a clip top surface portion, a clip bottom surface portion, a clip middle surface portion spanning between the top and bottom surface portions, ii. at least, one clip mating portion disposed on the second photovoltaic device assembly; at least one clip securing device is at least partially adapted to mate to first and third photovoltaic device assembly and connect to the at least one clip mating portion.

The invention may be further characterized by one or any combination of the features described herein, such as: the first photovoltaic device assembly includes at least one first pocket portion projecting from the first bottom surface portion towards the first top surface portion with a first pocket interior wall and a first pocket side wall, further wherein a third polymeric photovoltaic device assembly, that is horizontally adjacent to the first polymeric photovoltaic device assembly, includes at least one third pocket portion projecting from a third bottom surface portion towards a third top surface portion with a third pocket interior wall and a third pocket side wall, further wherein the at least one clip including a second clip mating portion, the clip mating portions are at least partially adapted to mate to at least a portion the pocket portions of the first and third polymeric photovoltaic device assemblies; the first photovoltaic device assembly includes a first clearance pocket in the first middle surface portion and the third polymeric photovoltaic device assembly includes a third clearance pocket in a third middle surface portion, the clearance pockets adapted to allow a portion of the clip hook portion to pass through in the installed position; the second top surface portion includes a upwardly projecting tab with a tab width and a tab depth and the hook portion includes a tab pocket with a tab pocket width, a tab pocket length, and a tab pocket depth that defines a tab pocket profile for accepting the upwardly projecting tab; the tab pocket width or tab pocket length is at least 10% larger than the upwardly projecting tab width or tab length; the first photovoltaic device assembly, the third photovoltaic device assembly, or both include two or more clips, or two or more pocket portions, or both; the at least one clip is comprised of a material with a Flexural Modulus of at least 600 MPa per ASTM D790.

It should be appreciated that the above referenced aspects and examples are non-limiting, as others exist within the present invention, as shown and described herein.

DESCRIPTION OF THE DRAWINGS

FIG. 5 is a sectional perspective view of three devices assembled with another exemplary clip according to the present invention.

DETAILED DESCRIPTION OF THE PREFERRED EMBODIMENT

Figure 1:
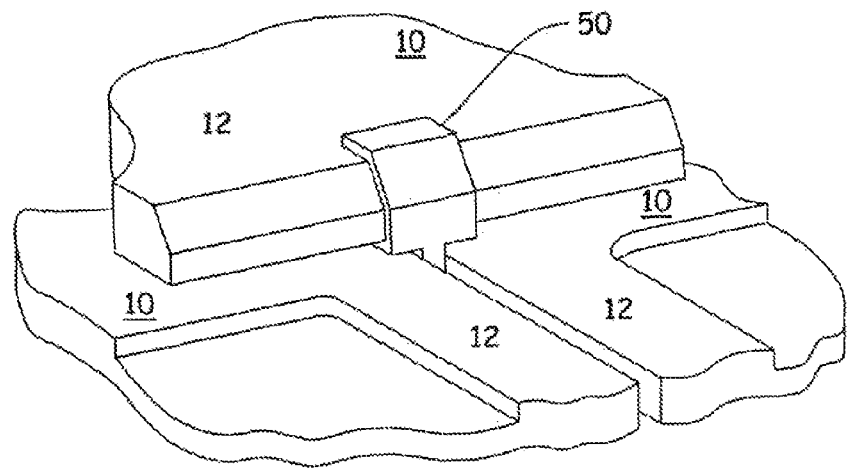
FIG. 1 is a sectional perspective view of three devices assembled with an exemplary clip according to the present invention.

The present invention is directed to a photovoltaic assembly system for securing and/or aligning at least a plurality of vertically adjacent (overlapping) photovoltaic device assemblies 10 (or overlapping photovoltaic device arrays) to one another. The devices 10 are preferably directly mounted to a structure (e.g. building structure, wall and/or roof deck). The present invention seeks to overcome the issue of wind uplift in with a unique clip solution and optionally taking advantage of that solution to address some of the other potential issues discussed above. FIG. 1 illustrates three photovoltaic devices 10 in an assembled arrangement (e.g. a lower photovoltaic device array consisting of two horizontally adjacent devices 10 and an overlapping upper photovoltaic device array consisting of one device 10). Other detailed drawings of the devices and/or the clips are shown in FIGS. 1-6.

Photovoltaic Device

In general, the photovoltaic device ("photovoltaic device assembly") 10 contemplated by the present invention is similar in construction to that disclosed in the PCT application PCT/US09/42496 which claims priority to U.S. Provisional Application 61/050,341; both of which are incorporated by reference for all purposes. The device can broadly be described as an assembly of a multi-layered laminate (with polymeric and non-polymeric layers) which is encapsulated on at least three sides by a polymeric casing 12 (e.g. a frame member). The device 10 is preferably adapted to mount directly to a structure, such as a building roof deck (with or without other items such as roofing felt or a previous layer of asphalt shingles), without the need for intermediate holding structures (e.g. frames, rails, risers, or the like). In broad terms, the device 10 is intended to be installed on a building (e.g. roof) in a similar fashion as standard asphalt shingles. In a preferred embodiment, the device 10 is rectangular in shape, with a generally flat profile and with a thickness of less than about 2 mm, preferably less than about 15 mm and greater than about 2 mm, more preferably greater than about 5 mm. It is contemplated that other shapes (square, round, polygon, etc. . . . ), other profiles (e.g. curved, stepped, etc. . . . ), and thicknesses (greater than about 15 mm) are possible. For the sake of brevity, the first photovoltaic device is described below, but it is contemplated that the second, third, and/or more devices are similarly constructed (e.g. second surface portions, third surface portions, etc. . . . ).

Figure 2:
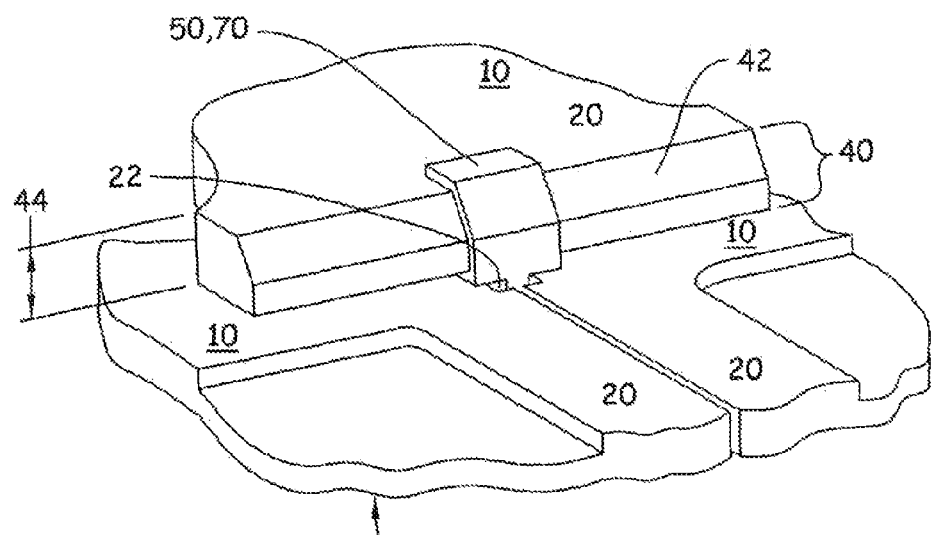
FIG. 2 is a sectional perspective view of three devices assembled with another exemplary clip according to the present invention.

The photovoltaic device 10 may be further defined, as illustrated in FIGS. 1-2, as a device 10 with a first top surface portion 20, a first bottom surface portion 30, a first middle surface portion 40 spanning between the top and bottom surface portions with a peripheral edge 42 and a thickness 44.

The device 10 may also have one or more local pocket portions 22 that project upwardly from the bottom surface portion 30 and that are adapted to receive the clips 50 described below. The pocket portions 22 may also project inward from the middle surface portion 40, allowing clearance (e.g. a clearance pocket) for the clips 50 to pass between horizontally adjoining devices 10. The pocket portions 22 may include a pocket interior wall (e.g. top of the pocket) and pocket side walls.

The device 10 may also include one or more tab projections 24 (e.g. a tab with a width, length and height) coming down from the bottom surface portion 30 and adapted to mate with a corresponding clip mating surface (not shown). The tab projections 24 may also project up from the top surface portion 20 and mate with a tab pocket 90 in the hook portion of the clips 50. In a preferred embodiment, the tab pocket has a width or length is at least 10% larger than the tab projections 24 length and or width.

The photovoltaic device 10 may also have an active portion 120 and an inactive portion 140, sometimes referred to as the "lower" and "upper" portions, respectfully, as illustrated in FIG. 5. The active portion 120 which may include a photovoltaic cell assembly 122 that allows transmission of light energy to a photoactive portion 126 of the photovoltaic device 10 for conversion into electrical energy.

The inactive portion 140 may include a region for receiving a fastener (e.g. screw, nail, or other mechanical fasteners, not shown), the fastener adapted to connect the device 10 to a structure (e.g. a roof deck or wall). The inactive portion 140 may also include a connection means, such as an electrical connector housing 144, which functions to string multiple devices 10 together. The region 142 may include a fastener location feature (not shown) such as visual or geometrical indicators to designate where the fasteners are to be placed.

In one preferred embodiment, the polymeric casing 12 or frame member, for example in the inactive portion 140, may include polyethylene, polypropylene, thermoplastic polyolefins, olefin block copolymers, thermoplastic urethanes, silicones, and many other polymers with and without fillers, including particularly glass fillers.

In one preferred embodiment, for example in the bottom surface portion 30 in the area of the active portion 120, may include thermoplastic polyolefin ("TPO"), thermoplastic elastomer, olefin block copolymers ("OBC"), natural rubbers, synthetic rubbers, polyvinyl chloride, and other elastomeric and plastomeric materials, polyolefins, polyester amides, polysulfone, acetel, acrylic, polyvinyl chloride, nylon, polycarbonate, phenolic, polyetheretherketone, polyethylene terephthalate, epoxies, including glass and mineral filled composites or any combination thereof.

Clip(s)

Figure 3:
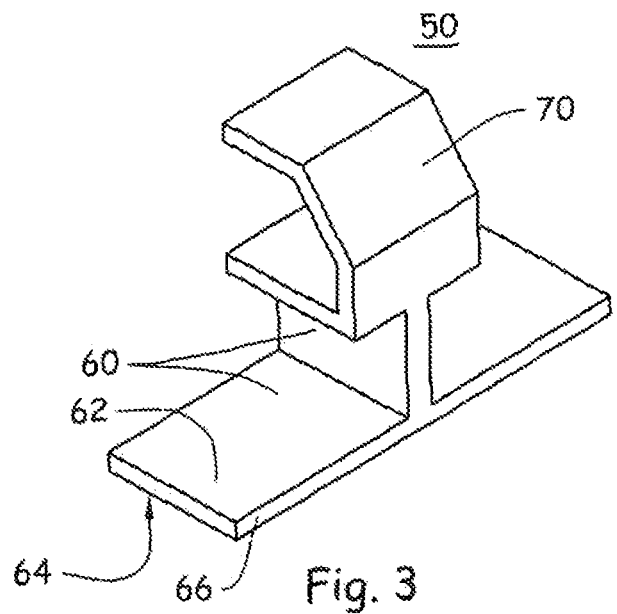
FIG. 3 is a perspective view of an exemplary clip according to the present invention.
Figure 4:
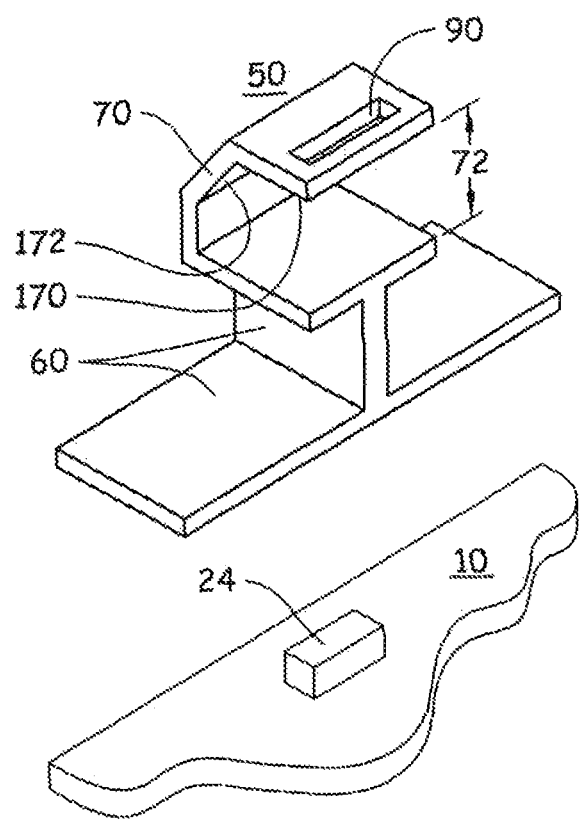
FIG. 4 is a perspective view of another exemplary clip and a device with a tab according to the present invention.

Clip(s) 50 generally function as the means for connecting two horizontally adjoining devices 10 to one at least partially vertically adjoining (overlapping) device 10. Positionally, it is preferred that at least one of the clips 50 be located at or near the peripheral edge 42 of the two horizontally adjoining devices 10, preferably in the area of the inactive portion 140, as shown in FIGS. 1, 2, and 5. It is also contemplated that the clips 50 may be a singular structure, as seen in FIGS. 3-4, or may be an multi-piece structure, as seen in FIG. 5. For clarification purposes, the terms "disposed" refers to a location of an element and "connectively disposed" refers to the location and that the elements are in contact with each other.

In general, it is preferred that the clips 50, individually or as a group, maintain a minimum peel force (e.g. holding down the vertically adjacent device 10 when assembled) of about 3 PLI (pounds per lineal inch), more preferably about 5 PLI, and most preferred about 10 PLI or more, per ASTM D 903-98 at temperatures between −40° C. and 85° C. In one preferred embodiment, the at least one clip 50 may be comprised of a material with a Flexural modulus of at least 600 MPa per ASTM D 790-03.

In general, the at least one clip 50 may be further defined as having at least one clip mating portion 60 including a clip top surface portion 62, a clip bottom surface portion 64, a clip middle surface 66 portion spanning between the clip top and bottom surface portions. In one preferred embodiment, the clips 50 may be slipped in between the first and third devices 10 during assembly, or twisted like butterfly (i.e. to overlap adjacent device edges) to be put in place.

The clips 50 may be comprised of a corrosive resistant material (e.g. coated metal, stainless steel, aluminum, polymers, or similar) due to the possible exposure to environmental conditions.

Optionally, the clips 50 may also include a reinforcement member (not shown), that functions to increase the stiffness and/or strength of the clips 50. It is contemplated that the reinforcement member may comprise metal, fibers (e.g. glass, carbon, or the like) or any material with a higher modulus that the clip material.

In a first preferred embodiment, as illustrated in FIGS. 1-4 a portion of the clip 50 may be generally "L, C or T" shaped, creating a hook-like structure that protrudes from one device 10 and "hooks" the adjoining second device (e.g. the vertically adjoin device 10) about a portion of its periphery. It may be further defined as the at least one clip 50 including at least one clip hook portion 70 that is at least partially adapted to mate to the middle surface portion 40 of the second photovoltaic device.

In one aspect of the first embodiment, the clip hook portion 70 can have a vertical height 72 (at least over part of the clip hook portion 70 surface) that is at least about 5% greater than the thickness 44 of the device it is mating to. More preferably at least about 10% greater and most preferably about 15% greater for installation purposes. The vertical height 72 in this portion of the hook 70 creates a clearance area 170 between the adjoining devices 10.

In another aspect of the first embodiment, the clip hook portion 70 can have a vertical height 72 (at least over part of the clip hook portion 70 surface) that is about the same as or at least about 2% less than the thickness 44 of the device it is mating to. More preferably at least about 4% less and most preferably about 7% or less, such that the clip compresses the device 10 edge (after installation) closer to the vertically adjoining device 10, thus producing minimal gap therebetween. The vertical height 72 in this portion of the hook 70 creates an interference area 172 between the adjoining devices 10.

In another aspect of the first embodiment, the clip hook portion 70 has at least one clearance area 170 and at least one interference area 172. It is contemplated that these areas 170, 172 can span across a portion of the hook length (e.g. as in FIG. 4), width or both.

In a second preferred embodiment, as illustrated in FIG. 5, the clip mating portion 80 is integral to the device 10 and the clip hook portion 70 is pushed (or twisted) into a hole 88 in the clip mating portion 80. In this case, the clip mating portion 80 is part of the lower device 10, generally in the inactive portion 140. The hook portion 70 may include a securing device 72 such as outwardly projecting fins 74 adapted to secure the clip 50 in the hole 88. It is also contemplated that a post may be protruding from the lower device 10 and the hook portion 70 may be used to "cap" the post, creating the connection.

Figure 6:
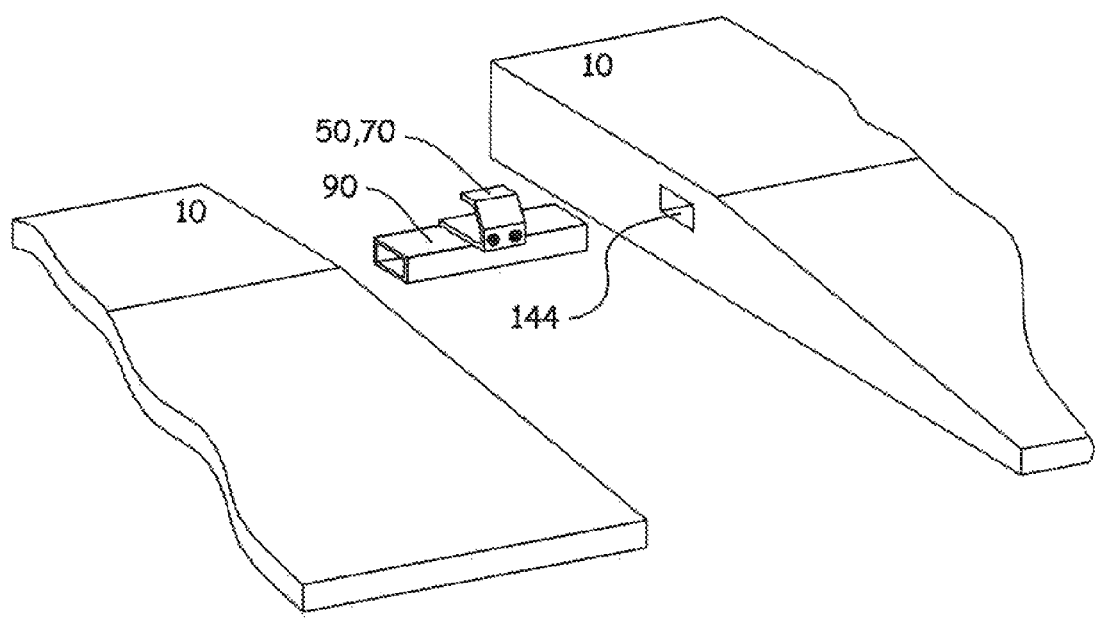
FIG. 6 is a sectional perspective view of two devices assembled with another exemplary clip according to the present invention.

In a third preferred embodiment, as illustrated in FIG. 6, the clip 50 is part of a connector device 90 (integral to as in the first embodiment, or connector to as in the second embodiment) that mates to the electrical connector housing 144. It may also include diagnosis or indicator features (e.g. lights) that may provide information as to the status of the devices 10.

It is contemplated that the areas 170, 172 described in the first embodiment may also be applicable to the second and third embodiments.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes.

The term "consisting essentially of" to describe a combination shall include the elements, ingredients, components or steps identified, and such other elements ingredients, components or steps that do not materially affect the basic and novel characteristics of the combination.

The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

What is claimed is:

1. A photovoltaic assembly system for securing and aligning at least a lower photovoltaic array with a first photovoltaic device assembly and a third photovoltaic device assembly, with an upper photovoltaic array with a second photovoltaic device assembly, wherein the second photovoltaic device assembly is at least partially overlapping to the first photovoltaic device assembly and the third photovoltaic device assembly, comprising:
   a. the first photovoltaic device assembly, with a first lower and a first upper portion, includes:
      i. a first top surface portion, a first bottom surface portion, a first middle surface portion spanning between the top and bottom surface portions;
   b. the second photovoltaic device assembly, with a second lower and a second upper portion, includes:
      i. a second top surface portion, a second bottom surface portion, a second middle surface portion spanning between the top and bottom surface portions;
   c. the third photovoltaic device assembly, with a third lower and a third upper portion, includes:
      i. a third top surface portion, a third bottom surface portion, a third middle surface portion spanning between the top and bottom surface portions; and
   d. at least one clip connectively disposed on the first, second, and third photovoltaic device, the clip including:
      i. at least one clip mating portion including a clip top surface portion, a clip bottom surface portion, a clip middle surface portion spanning between the top and bottom surface portions,
   at least one clip hook portion is at least partially adapted to mate to the middle surface portion of the second photovoltaic device and the top surface portion of the second photovoltaic device.

2. The photovoltaic assembly system according to claim 1, wherein the first photovoltaic device assembly includes at least one first pocket portion projecting from the first bottom surface portion towards the first top surface portion with a first pocket interior wall and a first pocket side wall, further wherein a third photovoltaic device assembly, that is horizontally adjacent to the first photovoltaic device assembly, includes at least one third pocket portion projecting from a third bottom surface portion towards a third top surface portion with a third pocket interior wall and a third pocket side wall, further wherein the at least one clip including a second clip mating portion, the clip mating portions are at least partially adapted to mate to at least a portion of the pocket portions of the first and third photovoltaic device assemblies.

3. The photovoltaic assembly system according to claim 2, wherein the first photovoltaic device assembly includes a first clearance pocket in the first middle surface portion and the third photovoltaic device assembly includes a third clearance pocket in a third middle surface portion, the clearance pockets adapted to allow a portion of the clip hook portion to pass through in the installed position.

4. The photovoltaic assembly system according to claim 1, wherein the second top surface portion includes a upwardly projecting tab with a tab width and a tab depth and the hook portion includes a tab pocket with a tab pocket width, a tab pocket length, and a tab pocket depth that defines a tab pocket profile for accepting the upwardly projecting tab.

5. The photovoltaic assembly system according to claim 4, wherein the tab pocket width or tab pocket length is at least 10% larger than the upwardly projecting tab width or tab length.

6. The photovoltaic assembly system according to claim 1, wherein the at least one clip is comprised of a material with a Flexural Modulus of at least 600 MPa per ASTM D790.

7. The photovoltaic assembly system according to claim 1, wherein the first, second and third photovoltaic device assemblies are adapted to mount directly to a structure.

8. The photovoltaic assembly system according to claim 1, wherein the first, second and third photovoltaic device assemblies each comprise an assembly of multi-layered laminate which is encapsulated on at least three sides by a polymeric casing.

9. The photovoltaic assembly system according to claim 1, wherein each of the first, second and third photovoltaic device assemblies comprise a lower active portion comprising a photovoltaic cell assembly and an upper inactive portion comprising a region for receiving a fastener adapted to connect the device assembly to a structure.

10. The photovoltaic assembly system according to claim 1, wherein the assembly system further comprises one or more electrical connector devices adapted to electrically connect adjacent first and third photovoltaic device assemblies and the clip is part of the connector device.

11. The photovoltaic assembly system according to claim 1, wherein the first, second and third photovoltaic device assemblies are adapted to mount directly to a structure.

12. A photovoltaic assembly system for securing and aligning at least an upper photovoltaic array with a first photovoltaic device assembly and a third photovoltaic device assembly, with an lower photovoltaic array with a second photovoltaic device assembly, wherein the first and third photovoltaic device assembly is at least partially overlapping to the first photovoltaic device assembly and the third photovoltaic device assembly, comprising:
   a. the first photovoltaic device assembly, with a first lower and a first upper portion, includes:
      i. a first top surface portion, a first bottom surface portion, a first middle surface portion spanning between the top and bottom surface portions;
   b. the second photovoltaic device assembly, with a second lower and a second upper portion, includes:
      i. a second top surface portion, a second bottom surface portion, a second middle surface portion spanning between the top and bottom surface portions;
   c. the third photovoltaic device assembly, with a third lower and a third upper portion, includes:
      i. a third top surface portion, a third bottom surface portion, a third middle surface portion spanning between the top and bottom surface portions; and
   d. at least one clip connectively disposed on the first, second, and third photovoltaic device, the clip including:
      i. at least one clip a-securing device including a clip top surface portion, a clip bottom surface portion, a clip middle surface portion spanning between the top and bottom surface portions,
      ii. at least one clip mating portion disposed on the second photovoltaic device assembly;
   at least one clip securing device is at least partially adapted to mate to first and third photovoltaic device assembly and connect to the at least one clip mating portion.

13. The photovoltaic assembly system according to according to claim 12, wherein the first photovoltaic device assembly, the third photovoltaic device assembly, or both include two or more clips, or two or more pocket portions, or both.

14. The photovoltaic assembly system according to claim 12, wherein the at least one clip is comprised of a material with a Flexural Modulus of at least 600 MPa per ASTM D790.

15. The photovoltaic assembly system according to claim 12, wherein the clip mating portion is integral to an inactive portion of the second photovoltaic device assembly.

16. The photovoltaic assembly system according to claim 15, wherein the integral clip mating portion is a hole and the clip further comprises a securing device adapted to secure the clip into the hole.

17. The photovoltaic assembly system according to claim 12, wherein the first, second and third photovoltaic device assemblies each comprise an assembly of multi-layered laminate which is encapsulated on at least three sides by a polymeric casing.

18. The photovoltaic assembly system according to claim 12, wherein each of the first, second and third photovoltaic device assemblies comprise a lower active portion comprising a photovoltaic cell assembly and an upper inactive portion comprising a region for receiving a fastener adapted to connect the device assembly to a structure.

* * * * *

UNITED STATES PATENT AND TRADEMARK OFFICE
CERTIFICATE OF CORRECTION

PATENT NO.          : 8,584,407 B2  
APPLICATION NO.     : 12/907530  
DATED               : November 19, 2013  
INVENTOR(S)         : Keenihan et al.

Page 1 of 1

It is certified that error appears in the above-identified patent and that said Letters Patent is hereby corrected as shown below:

In the Claims:

Column 10, Claim 13, Line 21, delete "according to"

Signed and Sealed this  
Thirteenth Day of May, 2014

Michelle K. Lee  
*Deputy Director of the United States Patent and Trademark Office*